(12) United States Patent (10) Patent No.: US 7,957,694 B2
Karabinis et al. (45) Date of Patent: Jun. 7, 2011

(54) SATELLITE-BAND SPECTRUM UTILIZATION FOR REDUCED OR MINIMUM INTERFERENCE

(75) Inventors: Peter D. Karabinis, Cary, NC (US); Santanu Dutta, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1004 days.

(21) Appl. No.: 11/200,609

(22) Filed: Aug. 10, 2005

(65) Prior Publication Data

US 2006/0040613 A1 Feb. 23, 2006

Related U.S. Application Data

(60) Provisional application No. 60/600,575, filed on Aug. 11, 2004.

(51) Int. Cl.
*H04B 7/185* (2006.01)
(52) U.S. Cl. ............... 455/12.1; 455/67.11; 455/63.2; 455/3.05; 455/63.1; 455/448
(58) Field of Classification Search .......... 455/3.05, 455/427–431, 11.1–13.4, 522, 68–70, 63.1, 455/63.2, 67.11
See application file for complete search history.

(56) References Cited

U.S. PATENT DOCUMENTS

| | | |
|---|---|---|
| 4,901,307 A | 2/1990 | Gilhousen et al. |
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A * | 4/1996 | Otten .................. 455/524 |
| 5,555,257 A | 9/1996 | Dent |
| 5,584,046 A | 12/1996 | Martinez et al. |
| 5,612,703 A | 3/1997 | Mallinckrodt |
| 5,619,525 A | 4/1997 | Wiedeman et al. |
| 5,631,898 A | 5/1997 | Dent |
| 5,640,698 A | 6/1997 | Shen et al. |
| 5,761,605 A | 6/1998 | Tawil et al. |
| 5,765,098 A | 6/1998 | Bella |
| 5,812,947 A | 9/1998 | Dent |

(Continued)

FOREIGN PATENT DOCUMENTS

EP 0 506 255 A2 9/1992

(Continued)

OTHER PUBLICATIONS

Partial International Search Report and Invitation to Pay Additional Fees for International Patent Application No. PCT/US2005/028595 mailed on Jan. 20, 2006.

(Continued)

*Primary Examiner* — Edward Urban
*Assistant Examiner* — Fayyaz Alam
(74) *Attorney, Agent, or Firm* — Myers Bigel Sibley & Sajovec, P.A.

(57) ABSTRACT

A first and/or a second communications system may provide communications service over a geographic area. A method of operating the first and/or the second communications systems may include generating a measure of aggregate interference reaching a satellite of the second communications system substantially from devices of the first communications system. The measure of aggregate interference reaching the satellite of the second communications system may be transmitted to an element of the first communications system.

28 Claims, 4 Drawing Sheets

U.S. PATENT DOCUMENTS

| | | | |
|---|---|---|---|
| 5,832,379 | A | 11/1998 | Mallinckrodt |
| 5,835,857 | A | 11/1998 | Otten |
| 5,848,060 | A | 12/1998 | Dent |
| 5,852,721 | A | 12/1998 | Dillon et al. |
| 5,875,180 | A | 2/1999 | Wiedeman et al. |
| 5,878,329 | A | 3/1999 | Mallinckrodt |
| 5,884,142 | A | 3/1999 | Wiedeman et al. |
| 5,907,541 | A | 5/1999 | Fairholm et al. |
| 5,926,758 | A | 7/1999 | Grybos et al. |
| 5,926,761 | A | 7/1999 | Reed et al. |
| 5,937,332 | A | 8/1999 | Karabinis |
| 5,940,753 | A | 8/1999 | Mallinckrodt |
| 5,991,345 | A | 11/1999 | Ramasastry |
| 5,995,832 | A | 11/1999 | Mallinckrodt |
| 6,011,951 | A | 1/2000 | King et al. |
| 6,023,605 | A | 2/2000 | Sasaki et al. |
| 6,052,560 | A | 4/2000 | Karabinis |
| 6,052,586 | A | 4/2000 | Karabinis |
| 6,067,442 | A | 5/2000 | Wiedeman et al. |
| 6,072,430 | A | 6/2000 | Wyrwas et al. |
| 6,085,094 | A | 7/2000 | Vasudevan et al. |
| 6,091,933 | A | 7/2000 | Sherman et al. |
| 6,097,752 | A | 8/2000 | Wiedeman et al. |
| 6,101,385 | A | 8/2000 | Monte et al. |
| 6,108,561 | A | 8/2000 | Mallinckrodt |
| 6,115,592 | A | 9/2000 | Ueda et al. |
| 6,134,437 | A | 10/2000 | Karabinis et al. |
| 6,157,811 | A | 12/2000 | Dent |
| 6,157,834 | A | 12/2000 | Helm et al. |
| 6,160,994 | A | 12/2000 | Wiedeman |
| 6,169,878 | B1 | 1/2001 | Tawil et al. |
| 6,198,730 | B1 | 3/2001 | Hogberg et al. |
| 6,198,921 | B1 | 3/2001 | Youssefzadeh et al. |
| 6,201,967 | B1 | 3/2001 | Goerke |
| 6,233,463 | B1 | 5/2001 | Wiedeman et al. |
| 6,240,124 | B1 | 5/2001 | Wiedeman et al. |
| 6,253,080 | B1 | 6/2001 | Wiedeman et al. |
| 6,256,497 | B1 | 7/2001 | Chambers |
| 6,282,434 | B1* | 8/2001 | Johannisson et al. ....... 455/562.1 |
| 6,324,405 | B1 | 11/2001 | Young et al. |
| 6,339,707 | B1 | 1/2002 | Wainfan et al. |
| 6,389,059 | B1* | 5/2002 | Smith et al. .................. 375/141 |
| 6,418,147 | B1 | 7/2002 | Wiedeman |
| 6,449,461 | B1 | 9/2002 | Otten |
| 6,490,441 | B1 | 12/2002 | Saito |
| 6,522,865 | B1 | 2/2003 | Otten |
| 6,628,919 | B1 | 9/2003 | Curello et al. |
| 6,684,057 | B2 | 1/2004 | Karabinis |
| 6,735,437 | B2 | 5/2004 | Mayfield et al. |
| 6,775,251 | B1 | 8/2004 | Wiedeman |
| 6,785,543 | B2 | 8/2004 | Karabinis |
| 6,856,787 | B2 | 2/2005 | Karabinis |
| 6,859,652 | B2 | 2/2005 | Karabinis et al. |
| 6,879,829 | B2 | 4/2005 | Dutta et al. |
| 6,892,068 | B2 | 5/2005 | Karabinis et al. |
| 6,937,857 | B2 | 8/2005 | Karabinis |
| 6,975,837 | B1 | 12/2005 | Santoru |
| 6,990,327 | B2 | 1/2006 | Zheng et al. |
| 6,999,720 | B2 | 2/2006 | Karabinis |
| 7,006,789 | B2 | 2/2006 | Karabinis et al. |
| 7,031,702 | B2 | 4/2006 | Karabinis et al. |
| 7,039,400 | B2 | 5/2006 | Karabinis et al. |
| 7,062,267 | B2 | 6/2006 | Karabinis |
| 7,092,708 | B2 | 8/2006 | Karabinis |
| 7,113,743 | B2 | 9/2006 | Karabinis |
| 7,113,778 | B2 | 9/2006 | Karabinis |
| 7,155,340 | B2 | 12/2006 | Churan |
| 7,174,127 | B2 | 2/2007 | Otten et al. |
| 7,181,161 | B2 | 2/2007 | Karabinis |
| 7,203,490 | B2 | 4/2007 | Karabinis |
| 7,218,931 | B2 | 5/2007 | Karabinis |
| 7,295,807 | B2 | 11/2007 | Karabinis |
| 7,340,213 | B2 | 3/2008 | Karabinis et al. |
| 7,418,236 | B2 | 8/2008 | Levin et al. |
| 7,418,263 | B2 | 8/2008 | Dutta et al. |
| 7,421,342 | B2 | 9/2008 | Churan |
| 7,437,123 | B2 | 10/2008 | Karabinis et al. |
| 7,447,501 | B2 | 11/2008 | Karabinis |
| 7,453,396 | B2 | 11/2008 | Levin et al. |
| 7,454,175 | B2 | 11/2008 | Karabinis |
| 7,457,269 | B1 | 11/2008 | Grayson |
| 2002/0122408 | A1 | 9/2002 | Mullins |
| 2002/0146979 | A1 | 10/2002 | Regulinski et al. |
| 2002/0177465 | A1 | 11/2002 | Robinett |
| 2003/0003815 | A1 | 1/2003 | Yamada |
| 2003/0022625 | A1 | 1/2003 | Otten et al. |
| 2003/0054761 | A1 | 3/2003 | Karabinis |
| 2003/0054762 | A1 | 3/2003 | Karabinis |
| 2003/0054814 | A1* | 3/2003 | Karabinis et al. ............ 455/427 |
| 2003/0054815 | A1 | 3/2003 | Karabinis |
| 2003/0068978 | A1 | 4/2003 | Karabinis et al. |
| 2003/0073435 | A1* | 4/2003 | Thompson et al. ........... 455/428 |
| 2003/0073436 | A1* | 4/2003 | Karabinis et al. ............ 455/429 |
| 2003/0081573 | A1* | 5/2003 | Anderson et al. ............ 370/333 |
| 2003/0149986 | A1 | 8/2003 | Mayfield et al. |
| 2003/0153308 | A1 | 8/2003 | Karabinis |
| 2003/0224785 | A1 | 12/2003 | Karabinis |
| 2004/0072539 | A1 | 4/2004 | Monte et al. |
| 2004/0102156 | A1 | 5/2004 | Loner |
| 2004/0121727 | A1 | 6/2004 | Karabinis |
| 2004/0142660 | A1 | 7/2004 | Churan |
| 2004/0192200 | A1 | 9/2004 | Karabinis |
| 2004/0192293 | A1 | 9/2004 | Karabinis |
| 2004/0192395 | A1 | 9/2004 | Karabinis |
| 2004/0203393 | A1 | 10/2004 | Chen |
| 2004/0203742 | A1 | 10/2004 | Karabinis |
| 2004/0219900 | A1 | 11/2004 | Zheng et al. |
| 2004/0229590 | A1 | 11/2004 | Kubo et al. |
| 2004/0240525 | A1 | 12/2004 | Karabinis et al. |
| 2005/0026606 | A1 | 2/2005 | Karabinis |
| 2005/0037749 | A1 | 2/2005 | Karabinis et al. |
| 2005/0041619 | A1 | 2/2005 | Karabinis et al. |
| 2005/0064813 | A1 | 3/2005 | Karabinis |
| 2005/0079816 | A1 | 4/2005 | Singh et al. |
| 2005/0085186 | A1* | 4/2005 | Sandrin ........................ 455/12.1 |
| 2005/0090256 | A1 | 4/2005 | Dutta |
| 2005/0118948 | A1 | 6/2005 | Karabinis et al. |
| 2005/0136836 | A1 | 6/2005 | Karabinis et al. |
| 2005/0164700 | A1 | 7/2005 | Karabinis |
| 2005/0164701 | A1 | 7/2005 | Karabinis et al. |
| 2005/0170834 | A1 | 8/2005 | Dutta et al. |
| 2005/0181786 | A1 | 8/2005 | Karabinis et al. |
| 2005/0201449 | A1 | 9/2005 | Churan |
| 2005/0208890 | A1 | 9/2005 | Karabinis |
| 2005/0221757 | A1 | 10/2005 | Karabinis |
| 2005/0227618 | A1 | 10/2005 | Karabinis et al. |
| 2005/0239399 | A1 | 10/2005 | Karabinis |
| 2005/0239403 | A1 | 10/2005 | Karabinis |
| 2005/0239404 | A1 | 10/2005 | Karabinis |
| 2005/0239457 | A1 | 10/2005 | Levin et al. |
| 2005/0245192 | A1 | 11/2005 | Karabinis |
| 2005/0260947 | A1 | 11/2005 | Karabinis et al. |
| 2005/0260984 | A1 | 11/2005 | Karabinis |
| 2005/0265273 | A1 | 12/2005 | Karabinis et al. |
| 2005/0272369 | A1 | 12/2005 | Karabinis et al. |
| 2005/0282542 | A1 | 12/2005 | Karabinis |
| 2005/0288011 | A1 | 12/2005 | Dutta |
| 2006/0040659 | A1 | 2/2006 | Karabinis |
| 2006/0094352 | A1 | 5/2006 | Karabinis |
| 2006/0094420 | A1 | 5/2006 | Karabinis |
| 2006/0105707 | A1 | 5/2006 | Karabinis |
| 2006/0111041 | A1 | 5/2006 | Karabinis |
| 2006/0111056 | A1 | 5/2006 | Dutta |
| 2006/0135058 | A1 | 6/2006 | Karabinis |
| 2006/0135070 | A1 | 6/2006 | Karabinis |
| 2006/0165120 | A1 | 7/2006 | Karabinis |
| 2006/0189274 | A1 | 8/2006 | Karabinis |
| 2006/0189275 | A1 | 8/2006 | Karabinis |
| 2006/0189309 | A1 | 8/2006 | Good et al. |
| 2006/0194576 | A1 | 8/2006 | Karabinis et al. |
| 2006/0205346 | A1 | 9/2006 | Evans et al. |
| 2006/0205347 | A1 | 9/2006 | Karabinis |
| 2006/0205367 | A1 | 9/2006 | Karabinis |
| 2006/0211371 | A1 | 9/2006 | Karabinis et al. |
| 2006/0211419 | A1 | 9/2006 | Karabinis |
| 2006/0211452 | A1 | 9/2006 | Karabinis |
| 2006/0217070 | A1 | 9/2006 | Karabinis |

| | | | |
|---|---|---|---|
| 2006/0232465 A1 | 10/2006 | Levin et al. | |
| 2006/0233147 A1 | 10/2006 | Karabinis | |
| 2006/0246838 A1 | 11/2006 | Karabinis | |
| 2006/0252368 A1 | 11/2006 | Karabinis | |
| 2006/0276129 A1 | 12/2006 | Karabinis | |
| 2006/0292990 A1 | 12/2006 | Karabinis et al. | |
| 2007/0010246 A1 | 1/2007 | Churan | |
| 2007/0015460 A1 | 1/2007 | Karabinis et al. | |
| 2007/0021059 A1 | 1/2007 | Karabinis et al. | |
| 2007/0021060 A1 | 1/2007 | Karabinis et al. | |
| 2007/0026867 A1 | 2/2007 | Karabinis | |
| 2007/0037514 A1 | 2/2007 | Karabinis | |
| 2007/0072545 A1 | 3/2007 | Karabinis et al. | |
| 2007/0087690 A1 | 4/2007 | Karabinis | |
| 2007/0099562 A1 | 5/2007 | Karabinis et al. | |
| 2007/0123252 A1 | 5/2007 | Tronc et al. | |
| 2007/0129019 A1 | 6/2007 | Otten et al. | |
| 2007/0135051 A1 | 6/2007 | Zheng et al. | |
| 2007/0149127 A1 | 6/2007 | Karabinis | |
| 2007/0184849 A1 | 8/2007 | Zheng | |
| 2007/0192805 A1 | 8/2007 | Dutta et al. | |
| 2007/0202816 A1 | 8/2007 | Zheng | |
| 2007/0232298 A1 | 10/2007 | Karabinis | |
| 2007/0243866 A1 | 10/2007 | Karabinis | |
| 2007/0281612 A1 | 12/2007 | Benjamin et al. | |
| 2007/0293214 A1 | 12/2007 | Ansari et al. | |
| 2008/0008264 A1 | 1/2008 | Zheng | |
| 2008/0032671 A1 | 2/2008 | Karabinis | |
| 2008/0032690 A1 | 2/2008 | Karabinis | |
| 2008/0113666 A1 | 5/2008 | Monte et al. | |
| 2008/0119190 A1 | 5/2008 | Karabinis | |
| 2008/0160993 A1 | 7/2008 | Levin et al. | |
| 2008/0182572 A1 | 7/2008 | Tseytlin et al. | |
| 2008/0214207 A1 | 9/2008 | Karabinis | |
| 2008/0268836 A1 | 10/2008 | Karabinis et al. | |
| 2009/0011704 A1 | 1/2009 | Karabinis | |
| 2009/0029696 A1 | 1/2009 | Karabinis | |
| 2009/0040100 A1 | 2/2009 | Levin et al. | |
| 2009/0042509 A1 | 2/2009 | Karabinis et al. | |
| 2009/0042516 A1 | 2/2009 | Karabinis | |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1569363 | 11/2008 |
| WO | WO 01/54314 A1 | 7/2001 |
| WO | WO 01/89245 | 11/2001 |

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", Wireless Networks, Vo. 4, 1998, pp. 189-198.

International Search Report and Written Opinion for PCT/US2005/028595 mailed May 23, 2006.

Office Action, Mexican Patent Application No. MX/A/2007/001677, Jan. 15, 2010, 10 pages including translation.

* cited by examiner

SATELLITE-BAND SPECTRUM UTILIZATION FOR REDUCED OR MINIMUM INTERFERENCE

CROSS-REFERENCE TO RELATED APPLICATION

This application claims the benefit of provisional Application No. 60/600,575, filed Aug. 11, 2004, entitled Satellite-Band Spectrum Utilization for Reduced or Minimum Interference, the disclosures of which is hereby incorporated herein by reference in its entirety as if set forth fully herein.

FIELD OF THE INVENTION

This invention relates to wireless communications systems and methods, and more particularly to satellite communications systems and methods.

BACKGROUND

Satellite radioterminal communications systems and methods are widely used for radioterminal communications. Satellite radioterminal communications systems and methods generally employ at least one space-based component, such as one or more satellites that is/are configured to wirelessly communicate with a plurality of satellite radioterminals.

A satellite radioterminal communications system or method may utilize a single antenna pattern (i.e., a global beam) to cover an entire area served by the system. Alternatively or in addition, in cellular satellite radioterminal communications systems and methods, multiple antenna patterns (i.e., beams or cells) are provided, each of which can serve substantially distinct geographical areas in an overall service region, to collectively serve an overall satellite footprint. Thus, a cellular architecture similar to that used in conventional terrestrial cellular radioterminal systems and methods can be implemented in cellular satellite-based systems and methods. The satellite typically communicates with radioterminals over a bidirectional communications pathway, with radioterminal communication signals being communicated from the satellite to the radioterminal over a down-link, forward-link or forward service link, and from the radioterminal to the satellite over an up-link, return-link or return service link.

The overall design and operation of cellular satellite radioterminal systems and methods are well known to those having skill in the art, and need not be described further herein. Moreover, as used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and/or a pager, Internet and/or Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal," or "wireless user device".

As is well known to those having skill in the art, terrestrial networks can enhance cellular satellite radioterminal system availability, efficiency and/or economic viability by terrestrially reusing at least some of the frequency bands that are allocated to cellular satellite radioterminal systems. In particular, it is known that it may be difficult for cellular satellite radioterminal systems to reliably serve densely populated areas, because the satellite signal may be blocked by high-rise structures and/or may not penetrate into buildings. As a result, the satellite band spectrum may be underutilized or unutilized in such areas. The use of terrestrial retransmission of all or some of the satellite band frequencies can reduce or eliminate this problem.

Moreover, the capacity of the overall system can be increased significantly by the introduction of terrestrial retransmission, since terrestrial frequency reuse can be much denser than that of a satellite-only system. In fact, capacity can be enhanced where it may be mostly needed, i.e., in and/or proximate to densely populated urban, industrial, and/or commercial areas. As a result, the overall system can become much more economically viable, as it may be able to serve a much larger subscriber base. Finally, satellite radioterminals for a satellite radioterminal system having a terrestrial component within the same satellite frequency band and using substantially the same air interface for both terrestrial and satellite communications can be more cost effective and/or aesthetically appealing. Conventional dual band and/or dual mode alternatives, such as the well known Thuraya, Iridium and/or Globalstar dual mode satellite and/or terrestrial radiotelephone systems, may duplicate some components, which may lead to increased cost, size and/or weight of the radioterminal.

U.S. Pat. No. 6,684,057 issued Jan. 27, 2004, to the present inventor Karabinis, and entitled Systems and Methods for Terrestrial Reuse of Cellular Satellite Frequency Spectrum, the disclosure of which is hereby incorporated herein by reference in its entirety as if set forth fully herein, describes that a satellite radioterminal frequency can be reused terrestrially by an ancillary terrestrial network even within the same satellite cell, using interference cancellation techniques. In particular, the satellite radioterminal system according to some embodiments of U.S. Pat. No. 6,684,057 includes a space-based component that is configured to receive wireless communications from a first radioterminal in a satellite footprint over a satellite radioterminal frequency band, and an ancillary terrestrial network that is configured to receive wireless communications from a second radioterminal in the satellite footprint over the satellite radioterminal frequency band. The space-based component also receives the wireless communications from the second radioterminal in the satellite footprint over the satellite radioterminal frequency band as interference, along with the wireless communications that are received from the first radioterminal in the satellite footprint over the satellite radioterminal frequency band. An interference reducer is responsive to the space-based component and to the ancillary terrestrial network that is configured to reduce the interference from the wireless communications that are received by the space-based component from the first radioterminal in the satellite footprint over the satellite radioterminal frequency band, using the wireless communications that are received by the ancillary terrestrial network from the second radioterminal in the satellite footprint over the satellite radioterminal frequency band.

U.S. Patent Application Publication No. 2003/0054761 A1, published Mar. 20, 2003 to the present inventor Karabinis and entitled Spatial Guardbands for Terrestrial Reuse of Satellite Frequencies, the disclosure of which is hereby incorporated herein by reference in its entirety as if set forth fully herein, describes satellite radioterminal systems that include a space-based component that is configured to provide wireless radioterminal communications in a satellite footprint over a satellite radioterminal frequency band. The satellite footprint is divided into a plurality of satellite cells, in which satellite radioterminal frequencies of the satellite radioterminal frequency band are spatially reused. An ancillary terrestrial network is configured to terrestrially reuse at least one of the ancillary radioterminal frequencies that is used in a satellite cell in the satellite footprint, outside the cell and in some embodiments separated therefrom by a spatial guardband. The spatial guardband may be sufficiently large to reduce or prevent interference between the at least one of the satellite radioterminal frequencies that is used in the satellite cell in the satellite footprint, and the at least one of the satellite radioterminal frequencies that is terrestrially reused outside the satellite cell and separated therefrom by the spatial guardband. The spatial guardband may be about half a radius of a satellite cell in width.

U.S. Patent Application Publication No. US 2003/0054815 A1, published Mar. 20, 2003 to the present inventor Karabinis, and entitled Methods and Systems for Modifying Satellite Antenna Cell Patterns in Response to Terrestrial Reuse of Satellite Frequencies, the disclosure of which is hereby incorporated herein by reference in its entirety as if set forth fully herein, describes that space-based wireless radioterminal communications are provided in a satellite footprint over a satellite radioterminal frequency band. The satellite footprint is divided into satellite cells in which satellite radioterminal frequencies of the satellite radioterminal frequency band are spatially reused. At least one of the satellite radioterminal frequencies that is assigned to a given satellite cell in the satellite footprint is terrestrially reused outside the given satellite cell. A radiation pattern of at least the given satellite cell is modified to reduce interference with the at least one of the satellite radioterminal frequencies that is terrestrially reused outside the given satellite cell.

SUMMARY

According to some embodiments of the present invention, methods of operating a first and/or a second communications system providing communications service over a geographic area may be provided. More particularly, a measure of aggregate interference reaching a satellite of the second communications system substantially from devices of the first communications system may be generated. The measure of aggregate interference reaching the satellite of the second communications system may then be transmitted to an element of the first communications system.

According to some other embodiments of the present invention, methods of operating a first and/or a second communications system providing communications service over a geographic area may be provided. More particularly, a measure of an aggregate interference reaching a satellite of the second communications system may be received at the first communications system. A transmission of an element of the first communications system may then be altered responsive to receiving the measure of the aggregate interference reaching the satellite of the second communications system.

According to still other embodiments of the present invention, methods of operating a first and/or a second communications system providing communications service over a geographic area may be provided. More particularly, a measure of interfering signals to the second communications system substantially generated by transmissions of the first communications system may be received at the first communications system from the second communications system. An interference received at a satellite of the second communications system may then be reduced responsive to the measure of interfering signals received from the second communications system.

According to yet other embodiments of the present invention, methods of operating a first and/or a second communications system providing communications service over a geographic area may be provided. More particularly, a measure of aggregate interference reaching a satellite of the second communications system substantially from devices of the first communications system may be generated. In addition, interference received at a satellite of the second communications system may be reduced responsive to the measure of aggregate interference reaching the satellite of the second communications system substantially from devices of the first communications system.

According to more embodiments of the present invention, methods of operating a first and/or a second communications system providing communications service to a plurality of radioterminals over a geographic area may be provided. Interference from the first communications system received at a radioterminal of the second communications system may be measured. Moreover, the measure of interference received at the radioterminal may be transmitted to an element of the second communications system.

According to still more embodiments of the present invention, a radioterminal may include an antenna, a receiver coupled to the antenna, and a controller coupled to the receiver. More particularly, the receiver may include a front-end filter configured to attenuate frequencies outside a band of frequencies for communication with the radioterminal. In addition, the receiver may be coupled between the antenna and the controller, and the controller may be configured to process communications received through the antenna and receiver.

DETAILED DESCRIPTION

Figure 1:
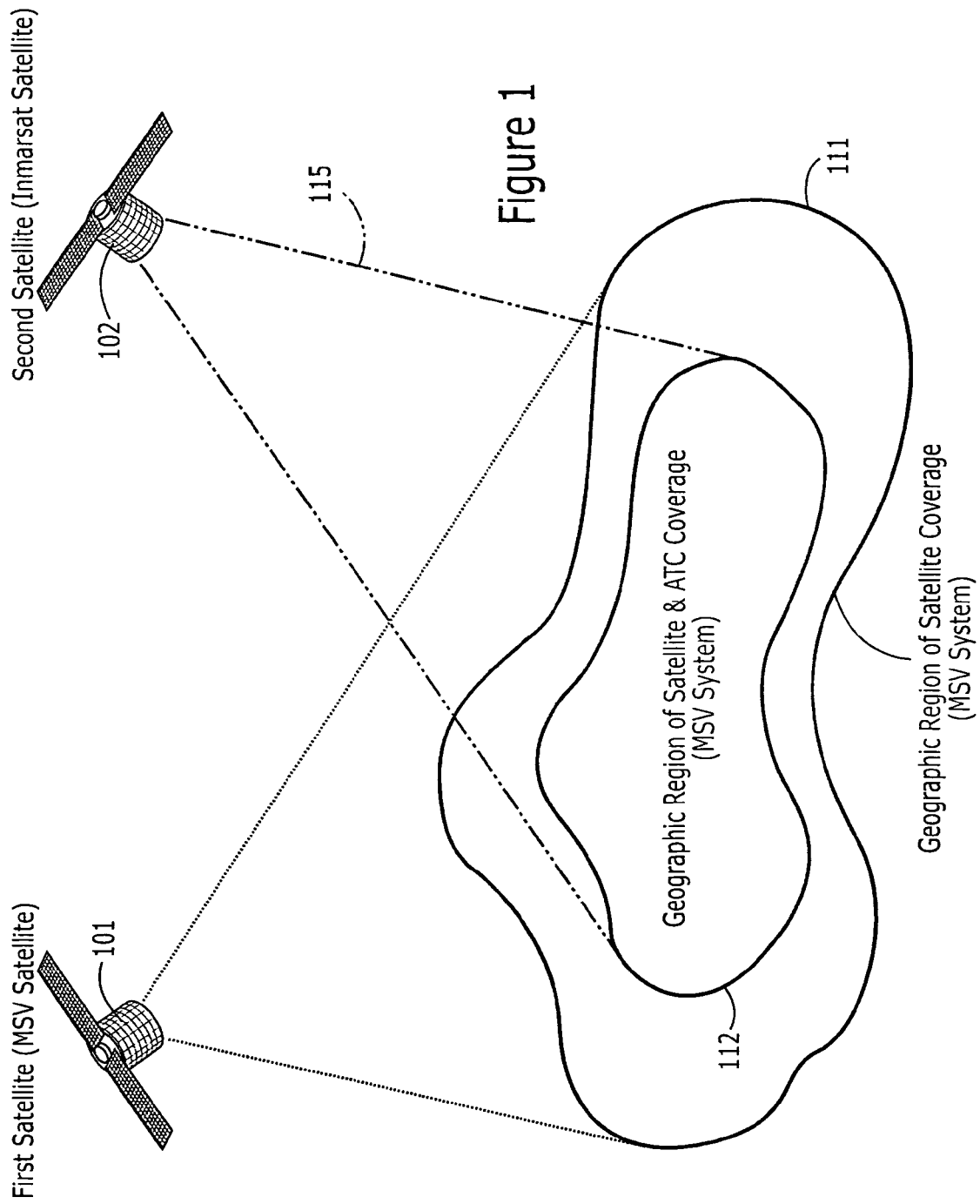
FIG. 1 is a diagram illustrating communications systems according to embodiments of the present invention.

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected", "coupled" or "responsive" to another element, it can be directly connected, coupled or responsive to the other element or intervening elements may be present. Furthermore, "connected", "coupled" or "responsive" as used herein may include wirelessly connected, coupled or responsive.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second may be used herein to describe various elements, these elements should not be limited by these terms. These terms are only used to distinguish one element from another element. Thus, a first radiotelephone below could be termed a second radiotelephone, and similarly, a second radiotelephone may be termed a first radiotelephone without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap in frequency, but that there may be some areas of non-overlap, for example at a band end(s). "Substantially the same" air interface(s) means that two or more air interfaces being compared are similar but need not be identical. Some differences may exist in one air interface (i.e., a satellite air interface) relative to another (i.e., a terrestrial air interface) to account for and/or accommodate different characteristics that may exist between, for example, a terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of 2 to 4 kbps, for example, may be used); a different forward error correction coding, different interleaving depth, and/or different spread-spectrum codes may also be used, for example, for satellite communications compared to the coding, interleaving depth, and/or spread spectrum codes (i.e., Walsh codes, long codes, and/or frequency hopping codes) that may be used for terrestrial communications.

Terrestrial reuse of satellite band frequencies, by radioterminals and/or terrestrial infrastructure components (also referred to as base stations, ancillary terrestrial components or ATCs, and/or ancillary terrestrial networks or ATNs), may subject a satellite system to up-link and/or down-link interference. Interference into a satellite and/or satellite gateway receiver, referred to as up-link interference (also referred to as return-link interference), may be generated, in part, by transmissions of radioterminals that are communicating with at least one terrestrial infrastructure component (base station) using at least some frequencies of a satellite up-link band and/or by transmissions of base stations that may also be using at least some of the satellite up-link band frequencies to communicate with radioterminals. A terrestrial infrastructure component (base station) may also be using at least some of the satellite up-link (return link) band frequencies to communicate with radioterminals as discussed, for example in U.S. Pat. No. 6,684,057, to Karabinis, entitled Systems and Methods for Terrestrial Reuse of Cellular Satellite Frequency Spectrum. The disclosure of U.S. Pat. No. 6,684,057 is hereby incorporated herein by reference in its entirety as if set forth fully herein. Interference into satellite radioterminal receivers, referred to as down-link interference (also referred to as forward-link interference), may occur from transmissions of base stations and/or radioterminals that are radiating at least some frequencies of a satellite down-link band. A radioterminal may also be using at least some of the satellite down-link (forward-link) band frequencies to communicate with at least one terrestrial infrastructure component (base station) as discussed, for example, in U.S. Continuation-in-Part patent application Ser. No. 10/730,660, to Karabinis, entitled Systems and Methods for Terrestrial Reuse of Cellular Satellite Frequency Spectrum in a Time-Division Duplex Mode, filed Dec. 8, 2003 and assigned to the assignee of the present invention. The disclosure of U.S. patent application Ser. No. 10/730,660 is hereby incorporated herein by reference in its entirety as if set forth fully herein. According to embodiments of the present invention, systems and methods may be used by a first and/or a second system operator, who may be concurrently operating a first and second system, respectively, to reduce or eliminate up-link and/or down-link interference therebetween. Moreover, each system may include a space-based and/or a ground-based sub-system, and each system may use one or more blocks of frequencies, of a given band of frequencies (such as an L-band of frequencies, S-band of frequencies and/or any other band of frequencies), over overlapping and/or separate geographic regions to provide services via the space-based and/or ground-based sub-system.

Some embodiments of the present invention will be described herein relative to the terms "first" and "second" systems. For convenience and for illustrative purposes the first system, and/or components thereof, may also be referred to as "MSV" and may, in some embodiments, correspond to a system provided by Mobile Satellite Ventures, LP (the assignee of the present invention). The second system and/or components thereof may be referred to as "non-MSV" or "Inmarsat." However, it will be understood that the invention is not limited to applications involving combinations of MSV and non-MSV or Inmarsat systems, and that any first and second system may be encompassed by the designations MSV and non-MSV or Inmarsat. Furthermore, as used herein, the term "measure" of a given signal (real-valued, complex-valued, scalar, vector, matrix, and/or of any other characteristic or dimension), and/or of any other physical or imaginary entity, includes any entity, observable and/or imaginary, that is related to, and/or derived from (via natural or man-induced processes) from the given signal (real-valued, complex-valued, scalar, vector, matrix, and/or of any other characteristic or dimension), and/or the other physical or imaginary entity. It will also be understood that even though some embodiments of the present invention may be described in terms of L-band systems and spectrum, the invention may be applied to any other (such as non-L-band) system and/or spectrum.

According to embodiments of the present invention, monitoring and control of up-link interference may be provided. Referring to FIG. 1, a wireless communications system may utilize L-band spectrum, and at least some of the down-link band frequencies of an L-band (i.e., from 1525 MHz to 1559 MHz) may be used by a first satellite 101 that may be operated by a first satellite operator (i.e., Mobile satellite Ventures, LP "MSV") to transmit information to at least one satellite radioterminal in the geographic region 111 of the first satellite 101. The at least some of the down-link band frequencies of the L-band (or a subset thereof) may also be used by a terrestrial infrastructure component, such as a base station, ATC, ATN, and/or a sub-system thereof, to transmit information to at least one radioterminal. The at least one radioterminal may be a stand-alone terrestrial-only radioterminal or an integrated radioterminal that may comprise at least some of the functionality of a stand-alone terrestrial-only radioterminal and at least some of the functionality of a satellite radioterminal. The terrestrial infrastructure component may be part of an overall infrastructure of an Ancillary Terrestrial Component (ATC) and part of an overall Ancillary Terrestrial Network (ATN) comprising a plurality of ATCs. As used herein, the term Ancillary Terrestrial Component (ATC) may also be referred to as a base station, and a plurality of ATCs may be included in an ATN.

ATCs are described, for example, in U.S. Pat. No. 6,684,057 to Karabinis, entitled Systems and Methods for Terrestrial Reuse of Cellular Satellite Frequency Spectrum; and Published U.S. patent application Ser. Nos. US 2003/0054760 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0143949 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Continuing with system embodiments utilizing L-band spectrum, at least some of the up-link band frequencies of an L-band (for example, from 1626.5 MHz to 1660.5 MHz) may be used by at least one satellite radioterminal to transmit information to the first satellite 101. The at least some of the up-link band frequencies of the L-band (or a subset thereof) may also be used by the satellite radioterminal and/or by at least one other radioterminal to transmit information to at least one terrestrial infrastructure component that may be part of an overall infrastructure of an Ancillary Terrestrial Component (ATC) and part of an overall Ancillary Terrestrial Network (ATN) comprising a plurality of ATCs. The satellite radioterminal may be a stand-alone satellite-only radioterminal or it may comprise at least some of the functionality of a stand-alone terrestrial-only radioterminal and at least some of the functionality of a satellite radioterminal. The at least one other radioterminal may be a stand-alone terrestrial-only radioterminal or an integrated radioterminal that may comprise at least some of the functionality of a stand-alone terrestrial-only radioterminal and at least some of the functionality of a satellite radioterminal.

Continuing with system embodiments utilizing L-band spectrum, a second satellite 102 that may be operated by a second satellite operator (i.e., Inmarsat) and/or the radioterminal(s) thereof may be using at least some of the L-band frequencies that are also used by the first satellite 101 and/or the radioterminals thereof to communicate. Specifically, at least some of the up-link band frequencies used by the satellite radioterminals communicating with the second satellite 102 may also be frequencies that are used by at least one radioterminal communicating with the first satellite 101 and/or the at least one terrestrial infrastructure component. As such, the second satellite 102 may receive a level of interference from the emissions of the at least one radioterminal communicating with the first satellite 101 and/or the at least one terrestrial infrastructure component.

According to embodiments of the present invention, the second satellite 102, which may be an Inmarsat 4 satellite, may form at least one beam (satellite cell) over a geographic region spanning an ensemble of radioterminal emissions that are intended for the first satellite 101 and/or the at least one terrestrial infrastructure component. Referring to FIG. 1, a geographic region 111 labeled "Geographic Region of Satellite Coverage (MSV System)" is shown. Within this geographic region 111, the First Satellite 101 (MSV Satellite) is providing communications services to satellite radioterminals. Included in the Geographic Region 111 of Satellite Coverage (MSV System) is a geographic region 112 labeled "Geographic Region of Satellite & ATC Coverage (MSV System)." Within this geographic region 112, communications services may be provided to radioterminals by the First Satellite 101 (MSV Satellite) and/or by infrastructure components (base stations) that may reuse at least some of the satellite band frequencies.

The at least one beam 115 (satellite cell) that may be formed by the Second Satellite 102 (Inmarsat Satellite) substantially over the Geographic Region of Satellite & ATC Coverage (MSV System), as illustrated in FIG. 1, may be configured to detect and/or estimate a measure of aggregate interference reaching the Second Satellite 102 (Inmarsat Satellite) from radioterminal and/or infrastructure component emissions originating from substantially within the Geographic Region of Satellite & ATC Coverage (MSV System) and are intended for the First Satellite 101 (MSV Satellite) and/or the at least one terrestrial infrastructure component. Techniques for detecting and/or estimating aggregate interference may be found, for example, in Published U.S. patent application Nos. US 2003/0054814 to Karabinis et al., entitled Systems and Methods for Monitoring Terrestrially Reused Satellite Frequencies to Reduce Potential Interference, and US 2003/0073436 to Karabinis et al., entitled Additional Systems and Methods for Monitoring Terrestrially Reused Satellite Frequencies to Reduce Potential Interference; both of which are assigned to the assignee of the present invention, the disclosures of which are hereby incorporated herein by reference in their entirety as if set forth fully herein. The Second Satellite 102 (Inmarsat Satellite) and/or other system element(s) associated with the Second Satellite 102 (Inmarsat Satellite), such as a satellite gateway, may be configured to further process the detected and/or estimated measure of aggregate interference reaching the Second Satellite 102 (Inmarsat Satellite) and relay a measure of the further processed detected and/or estimated measure of aggregate interference reaching the Second Satellite 102 (Inmarsat Satellite) and/or the detected and/or estimated measure of aggregate interference reaching the Second Satellite 102 (Inmarsat Satellite) to a system element associated with the First Satellite 101 (MSV Satellite) and/or the at least one terrestrial infrastructure component, ATC, or ATN associated with the First Satellite 101 (MSV Satellite). Responsive to the received measure of the further processed detected and/or estimated measure of aggregate interference reaching the Second Satellite 102 (Inmarsat Satellite) and/or the detected and/or estimated measure of aggregate interference reaching the Second Satellite 102 (Inmarsat Satellite) having approached, equaled, or exceeded a predetermined threshold, the at least one terrestrial infrastructure component, ATC, ATN, and/or at least one radioterminal that is substantially within the Geographic Region of Satellite & ATC Coverage (MSV System) and is associated with the First Satellite 101 (MSV Satellite) may be configured to reduce a level of transmitted radiation.

The at least one beam 115 (satellite cell) that may be formed by the Second Satellite 102 (Inmarsat Satellite) substantially over the Geographic Region of Satellite & ATC Coverage (MSV System), as illustrated in FIG. 1, may be a receive-only beam. The receive-only beam may provide to the Second Satellite 102 (Inmarsat Satellite) and/or other system element(s) associated with the Second Satellite 102 (Inmarsat Satellite), such as a satellite gateway, a measure of an aggregate signal power that is reaching the Second Satellite 102 (Inmarsat Satellite), representative of at least one emission occurring substantially within the Geographic Region of Satellite & ATC Coverage (MSV System), as illustrated in FIG. 1, over a band of frequencies that is used by at least one radioterminal and/or the at least one terrestrial infrastructure component.

In some embodiments, the Second Satellite 102 (Inmarsat Satellite), a satellite gateway(s) associate with the second satellite 102, and/or other system component(s) thereof may be equipped with an interference reducer to reduce interference in signals that are intended for the Second Satellite 102 (Inmarsat Satellite), caused by MSV System emissions (occurring from within any geographic region of satellite and/or ATC MSV system coverage). Interference reducers are known to those of skill in the art and need not be discussed further herein. Embodiments of interference reducers for reducing interference in satellite systems are disclosed for example, in the previously referenced U.S. Pat. No. 6,684,057, to Karabinis, entitled Systems and Methods for Terrestrial Reuse of Cellular Satellite Frequency Spectrum, published Jan. 27, 2004; in Utility patent application Ser. No. 10/890,758, to Karabinis et al., entitled Intra- and/or Inter-System Interference Reducing Systems and Methods for Satellite Communications Systems, filed Jul. 14, 2004; and in Provisional Patent Application No. 60/573,991 to Karabinis, entitled Systems and Methods for Monitoring Selected Terrestrially Reused Satellite Frequency Signals to Reduce Potential Interference, filed May 24, 2004; all of which are assigned to the assignee of the present invention, the disclosures of all of which are hereby incorporated herein by reference in their entirety as if set forth fully herein.

Figure 3:
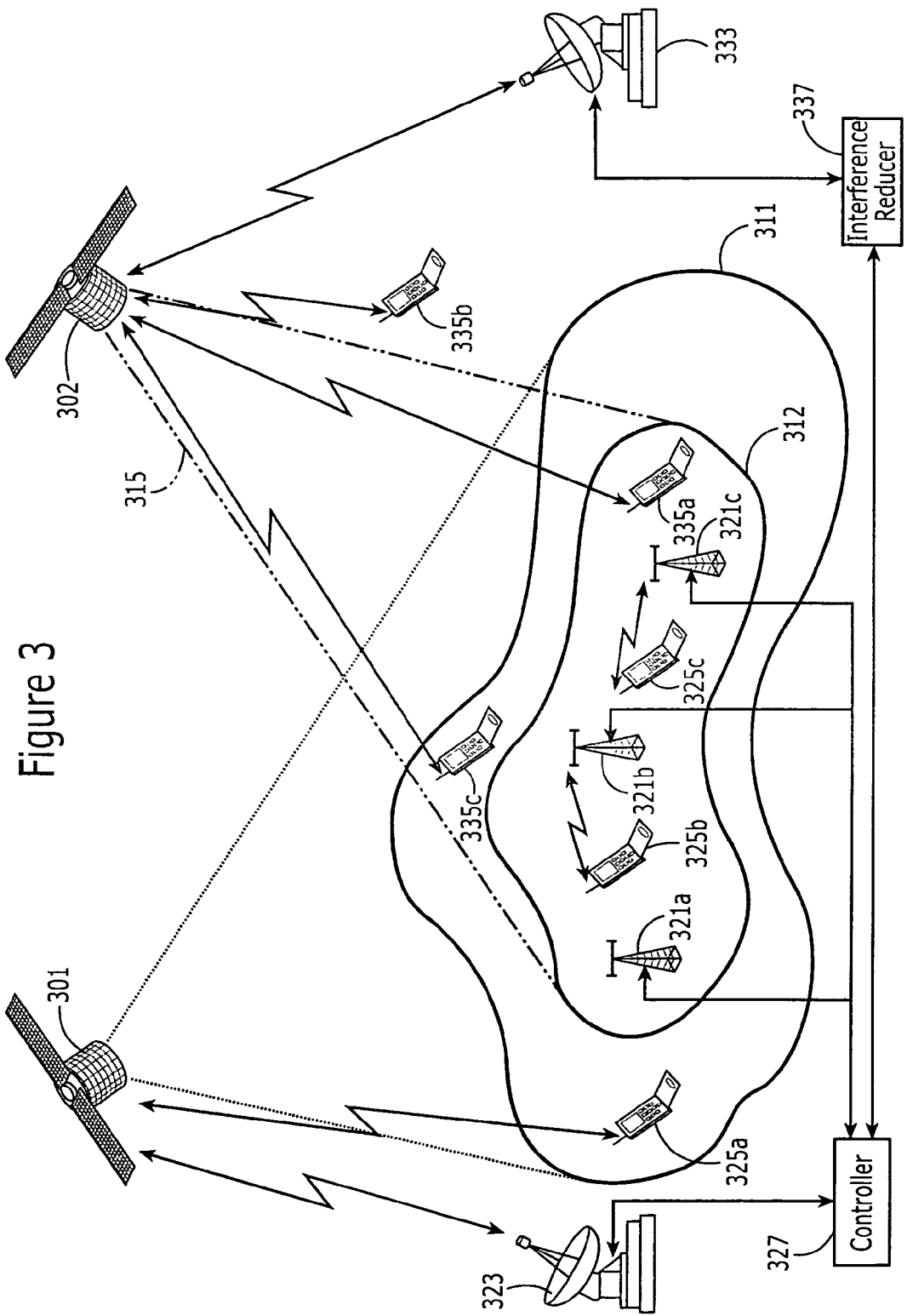
FIG. 3 is a diagram illustrating communications systems according to additional embodiments of the present invention.

It will be understood by those having skill in the art that some modifications may be applied to the interference reducer embodiments that are disclosed in the immediately above referenced Patent, Patent Application, and Provisional Patent Application when applying an interference reducer embodiment (of the Patent, Patent Application, and/or Provisional Patent Application) to reducing interference of a signal intended for an Inmarsat satellite. For example, whereas in the embodiments disclosed in the above referenced Patent, Patent Application, and Provisional Patent Application, the interference reducer may be configured to operate on a desired signal that is intended for an MSV satellite ("Signal of satellite cell S" in FIG. 3 of the above referenced Patent Application; signal "$f_U$" of the "Satellite Radiotelephone Link" in FIG. 1 of the above referenced Patent), the interference reducer, in accordance with embodiments of the present invention, may be configured to operate on a desired signal that is intended for an Inmarsat satellite. Furthermore, whereas in the embodiments disclosed in the above referenced Patent, Patent Application, and Provisional Patent Application, the interference reducer may be configured to operate at an MSV system location (such as at an MSV satellite gateway and/or other MSV facility), the interference reducer, in accordance with the embodiments of the present invention, may be configured to operate at an Inmarsat system location (such as at an Inmarsat satellite gateway and/or other Inmarsat facility). In addition to the above, at least some of the signals "T, U, V, W, X, Y, A3, A5, A7, B4, B6, B7" that are shown in FIG. 3 of the above referenced Patent Application and/or the signal "142" shown in FIG. 1 of the above referenced Patent, may be transported to an Inmarsat system location to be used as inputs to the interference reducer. In some embodiments, the interference signal input(s) "T, U, V, W, X, Y, A3, A5, A7, B4, B6, B7" that are shown in FIG. 3 of the above referenced Patent Application and/or the signal "142" shown in FIG. 1 of the above referenced Patent, and/or a desired signal plus interference (that may be provided to an Inmarsat system location by an Inmarsat satellite) may be delay-equalized to substantially align in time the interfering signal path(s) provided via the MSV satellite relative to the interference signal path(s) provided via the Inmarsat satellite. In some embodiments, the satellite 102 of the Inmarsat satellite system may form spot beams (that may be receive-only spot beams) over ATC areas of the MSV system and may thus provide to the interference reducer measures of the interfering signals. In some embodiments, measures of the interfering signals are provided by an MSV satellite and an Inmarsat satellite. In other embodiments, a desired signal plus interference that may be provided to an Inmarsat system facility (such as an Inmarsat satellite gateway), by an Inmarsat satellite, may be transported to a MSV system facility (such as an MSV satellite gateway) and the interference reducer may be configured to be functionally operative at the MSV system facility to reduce interference of a signal that is intended for an Inmarsat satellite.

In addition, or in alternatives, monitoring and control of down-link interference may be provided according to embodiments of the present invention. In accordance with system embodiments addressed earlier, utilizing L-band spectrum, portions of the down-link band frequencies of an L-band (for example, from 1525 MHz to 1559 MHz) may be used by a first system and a satellite (for example, satellite 101) thereof that may be operated by a first satellite operator (i.e., Mobile satellite Ventures, LP "MSV") to transmit information to at least one satellite radioterminal. The portions of the down-link band frequencies of the L-band (or a subset thereof) may also be used by at least one terrestrial infrastructure component (i.e., an ATC) that may be operated by and/or associated with the first system and the satellite thereof (MSV system), to transmit information to at least one radioterminal. A radioterminal of a second system (such as a satellite radioterminal of an Inmarsat system including satellite 102) may be operative while proximate to a terrestrial infrastructure component of the first system that is radiating at least some frequencies of the portions of the down-link band frequencies of the L-band (or a subset thereof) to communicate with at least one radioterminal. As such, the radioterminal of the second system may experience interference, such as overload interference and/or inter-modulation interference.

In some embodiments, a radioterminal may be operatively configured with signaling capability, such as, for example, in-band signaling capability, so as to inform a system, and/or a component thereof, such as a satellite gateway and/or other component of the system, of a Bit Error Rate (BER) measure at the radioterminal. In response to the BER measure received by the system, the system (i.e., a satellite and/or a satellite gateway) may provide a different amount of power to the radioterminal (such as more power to the radioterminal if the BER measure is, for example, greater than a first predetermined threshold, or less power to the radioterminal if the BER measure is, for example, smaller than a second predetermined threshold; where the first and second predetermined thresholds may be the same or different) relative to the power delivered to the radioterminal by the system prior to the reception by the system of the BER measure transmitted by the radioterminal via a signaling channel.

In other embodiments, in response to the BER measure received by the system from the radioterminal, and following a predetermined increase in power level to the radioterminal for the purpose of establishing a BER measure that may be within an acceptable range, the system may command the radioterminal to utilize a different down-link (forward-link) carrier and/or channel, if the radioterminal continues to report to the system a BER measure that is not within the predetermined range and is inferior to the system's Quality of Service (QoS) standard for the service being provided by the radioterminal. The different down-link (forward-link) carrier may be chosen from an available pool of carriers, and/or the different down-link (forward-link) carrier may be chosen at a maximum or near maximum frequency distance relative to a frequency or frequencies used by the at least one terrestrial infrastructure component, ATC, and/or ATN of the first system.

In yet other embodiments, in response to the BER measure received by the system from the radioterminal, the system may command the radioterminal to utilize a different down-link (forward-link) carrier and/or channel without first attempting to provide more power to the radioterminal. In some embodiments, the system may process at least two BER measures (a sequence of BER measures) before sending more power to the radioterminal and/or commanding the radioterminal to utilize a different down-link (forward-link) carrier. In some embodiments, one or more down-link (forward-link) signaling carriers/channels may be provided by a system (i.e., Inmarsat) at a frequency separation that is maximally-distant, or near maximally-distant, from a down-link (forward-link) band of frequencies used by another system (i.e., MSV).

Figure 2:
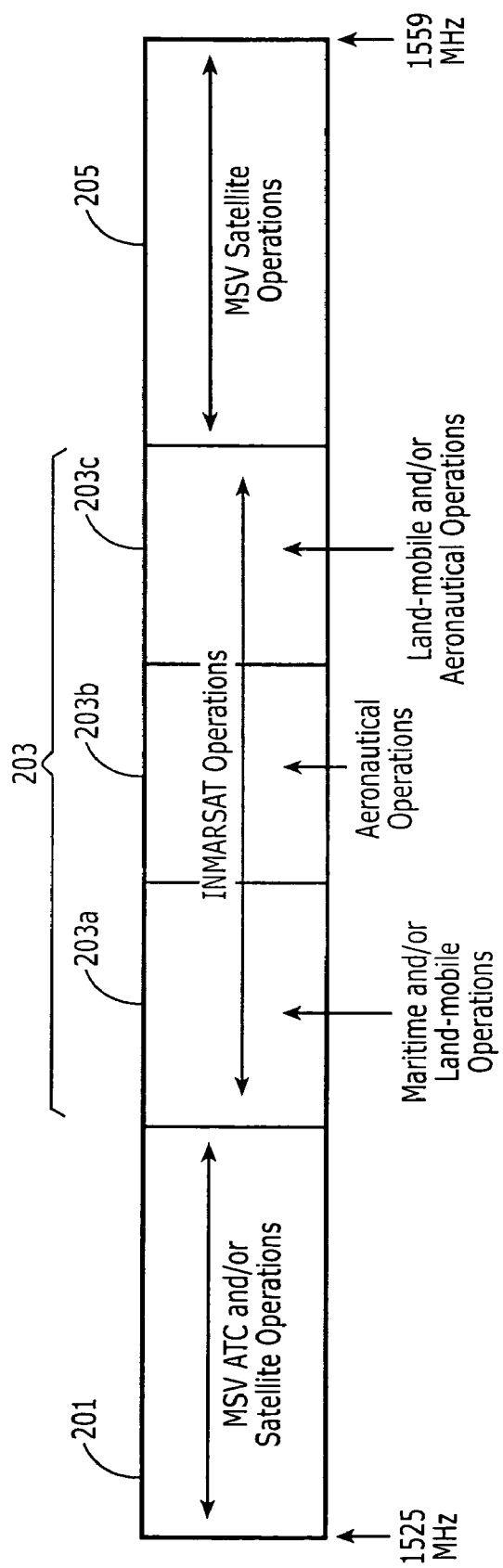
FIG. 2 is a diagram illustrating bandwidth sharing between communications systems according to embodiments of the present invention.

In additional embodiments of the present invention, to further reduce the potential of down-link interference, two systems (for example, a first system including satellite 101 and a second system including satellite 102) that are using a band of frequencies, such as an L-band of frequencies, may partition the band of frequencies into relatively large and contiguous blocks of spectrum, as illustrated in FIG. 2, and use the blocks of spectrum in accordance with a minimum or substantially minimum interference potential criterion. As illustrated in FIG. 2, a first relatively large contiguous block of down-link frequencies 201 (labeled "MSV ATC and/or Satellite Operations," which may be, for example, approximately 10 MHz in bandwidth) may be used by MSV to offer satellite and ATC service(s). Still referring to FIG. 2, a second block of frequencies 203 (labeled "INMARSAT Operations") may be, for example, approximately 17 MHz in bandwidth. The second block of frequencies 203 labeled "INMARSAT Operations" may be used by Inmarsat to offer satellite services with, for example, a first sub-block of frequencies 203a (that may be closest in frequency to the first block of frequencies 201 used by MSV for satellite and/or ATC operations) allocated, for example, by Inmarsat to maritime and/or land-mobile operations; followed by, for example, a second sub-block of frequencies 203b that may be allocated by Inmarsat to aeronautical operations; and followed by, for example, a third sub-block of frequencies 203c that may be allocated by Inmarsat to land-mobile and/or aeronautical operations. Following the INMARSAT Operations block (i.e., the second block of frequencies 203), as illustrated in FIG. 2, a third block of frequencies 205 (labeled "MSV Satellite Operations," which may be, for example, approximately 7 MHz in bandwidth) may be used by MSV for satellite services only. In some embodiments, at least a portion of the third block of frequencies 205 may also be used by MSV to provide ATC communications.

In accordance with the illustrative embodiment relating to L-band spectrum usage by two system operators (as depicted in FIG. 2 and described immediately above), at least some of the land-mobile operations of Inmarsat comprising land-mobile radioterminals that may be most susceptible to down-link interference, comprising, for example, a class of radioterminals configured for high-speed data mode(s) (such as Inmarsat radioterminals of type/class GAN, R-BGAN, and/or BGAN), may be allocated down-link carrier frequencies in the third Inmarsat sub-block 203c and/or at a maximum or near maximum frequency distance away from MSV's ATC operations. At least some aeronautical operations of Inmarsat may also be conducted over the third Inmarsat sub-block 203c and/or at a maximum, or near maximum, frequency separation from MSV's ATC operations. Owing to the mobility aspects of some land-mobile radioterminals (and/or some non-land-mobile radioterminals), at least some radioterminals communicating with satellite 102 may be operative, from time-to-time, from locations proximate to base station/ATC emissions generated by the communications system including satellite 101. The at least some radioterminals that may be operative proximate to such locations may include at least one radioterminal that may be relatively more susceptible to down-link interference than other radioterminals. (A radioterminal providing a high-speed data service, for example, may be more susceptible to down-link interference than a radioterminal providing, for example, a voice service and/or low-speed data service.) The at least one radioterminal that may be relatively more susceptible to down-link interference than the other radioterminals may be allocated a down-link carrier frequency in the third Inmarsat sub-block and/or at a maximum or near maximum frequency distance away from MSV's ATC operations. This may be accomplished a priori by the system, during a call set-up procedure between the radioterminal and the system, prior to establishing an initial communications channel, via recognition by the system of a radioterminal profile/identity/service, or it may be accomplished a posteriori, after an initial communications channel has been established and a measure of unacceptable performance has been provided to the system by the radioterminal, as described earlier.

In further embodiments of the invention, an operator (Inmarsat) of a system including the satellite 102 may deploy at least one terrestrial infrastructure component, ATC, and/or ATN in parts of, all, or substantially all of the geographic area that an operator (MSV) of a system including the satellite 101 plans to, and/or has deployed, at least one terrestrial infrastructure component, ATC, and/or ATN. Having done so, the second system operator (Inmarsat) may also configure at least some of the radioterminals that are capable of communicating with the satellite 102 of the second system to also be capable of communicating with the at least one terrestrial infrastructure component, ATC, and/or ATN of the second and/or first system, and/or a terrestrial infrastructure of any other system. As such, a radioterminal of the second system (that may be operative proximate to at least one terrestrial infrastructure component, ATC, and/or ATN of the first system, and may thus be subjected to down-link interference) may establish a communications link with the at least one terrestrial infrastructure component, ATC, and/or ATN of the second and/or first system, and/or the terrestrial infrastructure of the any other system (instead of communicating via a satellite) to minimize, or eliminate the potential of down-link and/or up-link interference.

In other embodiments of the invention, in order to further reduce or eliminate the potential of down-link interference, two systems that are using a band of frequencies, such as an L-band of frequencies, and may have partitioned the band of frequencies into relatively large and contiguous blocks of spectrum, as illustrated in FIG. 2, may incorporate filtering, such as band-pass, low-pass, high-pass, notch filtering and/or any other type of filtering, into at least some radioterminals to reduce further or eliminate the potential of interference. At least some radioterminals configured to communicate with the satellite 102 of the second system (Inmarsat system) may, for example, be configured with a receiver filter that attenuates at least some frequencies of the "MSV ATC and/or Satellite Operations" frequency block 201 more than frequencies of the "INMARSAT Operations" block 203. The filter may be a front-end filter (operatively configured at the Radio Frequency (RF) section of the radioterminal receiver; before and/or after the receiver Low Noise Amplifier (LNA)), or the filter may be operatively distributed between the RF, Intermediate Frequency (IF), and/or base-band sections of the radioterminal receiver. A filter characteristic, such as an attenuation response of the filter, may be operationally responsive to a geographic location of the radioterminal. For example, if the radioterminal is operative in North America (or proximate to North America) the filter attenuation response may be configured to attenuate at least some of the frequencies occupying the "MSV ATC and/or Satellite Operations" frequency block and/or any other MSV frequency block; otherwise, the filter may be switched out and/or by-passed, or may be altered in at least one characteristic. In some embodiments, at power-on of a radioterminal the radioterminal may be configured to function with the filter by-passed (or switched out), totally or partially. In other embodiments, radioterminals of a first system (MSV) may also be configured with a band-pass, low-pass, high-pass, notch and/or any other type of receiver-chain filter characteristic (distributed or lumped) that attenuates frequencies that lie outside of one or more MSV frequency blocks.

According to embodiments of the present invention shown in FIG. 3, a first wireless communications system may include a satellite 301, an ancillary terrestrial network (ATN) including a plurality of ancillary terrestrial components (ATCs) 321a-c (also referred to as base stations), a satellite gateway 323, and a communications system controller 327. The satellite 301 may provide communications services over a relatively large geographic region 311, and the ATN (including ATCs 321a-c) may provide communications services over a smaller geographic region 312. Accordingly, each of the radioterminals 325a-c of the first wireless communications system may be configured to establish communication links with the satellite 301 and/or with an ATC 321a-c. As shown in FIG. 3, the radioterminal 325a outside the geographic region 312 may establish a communications link with the satellite 301 while the radioterminals 325b-c inside the geographic region 312 may establish communications with one or more ATCs 321a-c. Moreover, a system controller 327 may coordinate operations of the first communications system. While a single contiguous geographic region 312 for ATC communications (using ATCs 321a-c) is shown inside the larger geographic region 311 for satellite communications (using satellite 301), a plurality of separate geographic regions may be provided for ATC communications, and/or a geographic region for ATC communications or portions thereof may be outside the geographic region 311 for satellite communications. Moreover, an aggregate geographic region of ATN/ATC coverage may be less than, the same as, or larger than an aggregate geographic region of satellite coverage.

If the radioterminal 325a moves to the geographic region 312, the radioterminal 325a may establish a communications link with one or more of the ATCs 321a-c. If either of the radioterminals 325b-c is moved outside the geographic region 312, the moved radioterminal(s) 325b and/or 325c may establish a communications link with the satellite 301. While radioterminals 325b-c may establish communications links with the satellite 301 while in the geographic region 312, communications links with ATCs may be preferred to increase system capacity and/or quality of service.

In addition, a second wireless communications system may include a satellite 302, a satellite gateway 333, and an interference reducer 337. The satellite 302 may provide communications services for radioterminals 335a-c. Moreover, the interference reducer may reduce up-link interference received at the satellite 302 resulting from transmissions of ATCs 321a-c, radioterminals 325a-c, and/or satellite 301 of the first communications system. In addition, the first and second communications systems of FIG. 3 may be operated by different system operators. While the interference reducer 337 is shown as a separate functional block, functionality of the interference reducer 337 and/or portions thereof may be implemented at the satellite 302, at the satellite gateway 333, at the controller 327 of the first communications system, at the satellite 301 of the first communications system, at the satellite gateway 323 of the first communications system, and/or at an ATC 321a-c of the first communications system. The interference reducer 337, for example, may be provided as a portion of a controller of the communications system including the satellite 302 and the satellite gateway 333.

Monitoring and control of up-link interference may thus be provided for the second communications system wherein the first and second communications systems use similar frequencies. More particularly, the first satellite 301 may use L-band spectrum, and at least some of the down-link band frequencies of an L-band (e.g., from 1525 MHz to 1559 MHz) may be used by a first satellite 301 that may be operated by a first satellite operator (e.g., Mobile satellite Ventures, LP "MSV") to transmit information to at least one satellite radioterminal (such as one or more of radioterminals 325a-c) in the geographic region 311 of the first satellite 301. The at least some of the down-link band frequencies of the L-band (or a subset thereof) may also be used by one or more of the ATCs 321a-c to transmit information to at least one of the radioterminals 325a-c in the geographic region 312 of the ATN. Each of the radioterminals 325a-c may be a stand-alone terrestrial-only radioterminal or an integrated radioterminal that may comprise at least some of the functionality of a stand-alone terrestrial-only radioterminal and at least some of the functionality of a satellite radioterminal.

Continuing with system embodiments using L-band spectrum, at least some of the up-link band frequencies of an L-band (for example, from 1626.5 MHz to 1660.5 MHz) may be used by one or more of the radioterminals 325a-c to transmit information to the first satellite 301. The at least some of the up-link band frequencies of the L-band (or a subset thereof) may also be used by the radioterminals 325a-c to transmit information to at least one of the ATCs 321a-c that may be part of an overall Ancillary Terrestrial Network (ATN) including a larger number of ATCs. One of the radioterminals 321a-c may be a stand-alone satellite-only radioterminal or it may comprise at least some of the functionality of a stand-alone terrestrial-only radioterminal and at least some of the functionality of a satellite radioterminal. Another of the radioterminals 325a-c may be a stand-alone terrestrial-only radioterminal or an integrated radioterminal that may comprise at least some of the functionality of a stand-alone terrestrial-only radioterminal and at least some of the functionality of a satellite radioterminal.

Continuing with system embodiments utilizing L-band spectrum, the second satellite 302 that may be operated by the second satellite operator (e.g., Inmarsat) and/or the radioterminal(s) 335a-c thereof may be using at least some of the L-band frequencies that are also used by the first satellite 301 and/or the radioterminals 325a-c thereof to communicate. Specifically, at least some of the up-link band frequencies used by the radioterminals 335a-c communicating with the second satellite 302 may also be frequencies that are used by at least one of the radioterminals 325a-c communicating with the first satellite 301 and/or with at least one of the ATCs 321a-c. The second satellite 302 may thus receive up-link interference from emissions/transmissions of at least one of the radioterminals 325a-c communicating with the first satellite 301 and/or at least one of the ATCs 321a-c. In some embodiments, at least one of the ATCs 321a-c may also be using at least some of the up-link frequencies used by the radioterminals 335a-c communicating with the second satellite 302 to communicate with at least one of the radioterminals 325a-c. The second satellite 302 may thus also receive up-link interference from emissions/transmissions of at least one of the ATCs 321a-c.

According to embodiments of the present invention, the second satellite 302 (which may be an Inmarsat 4 satellite) may form at least one beam 315 (satellite cell or antenna pattern) over a geographic region spanning an ensemble of radioterminal and/or ATC emissions that are intended for the first satellite 301, the ATCs 321a-c and/or the radioterminals 325a-c. Within the geographic region 311, the first satellite 301 (MSV Satellite) may provide communications services to satellite radioterminals of the first communications system (such as radioterminals 325a-c). As shown, the geographic region 312 may be included in the geographic region 311. Within the geographic region 312, communications services may be provided to one or more of radioterminals 325a-c by the first satellite 301 (MSV Satellite) and/or by the ATCs 321a-c that may reuse at least some of the satellite band frequencies.

The at least one beam 315 (satellite cell or antenna pattern) may be formed by the second (e.g., Inmarsat) satellite 302 substantially over the geographic region 312 over which the ATCs 321a-c operate, as shown in FIG. 3. Moreover, the beam 315 may be configured to detect and/or estimate a measure of aggregate interference reaching the second (e.g., Inmarsat) satellite 302 from radioterminal and/or ATC emissions originating from substantially within the Geographic Region 312 that are intended for radioterminals 325a-c, ATCs 321a-c and/or satellite 301 of the first communications system including satellite 301 and/or the ATN including ATCs 321a-c. Techniques for detecting and/or estimating aggregate interference may be found, for example, in Published U.S. patent application Nos. US 2003/0054814 to Karabinis et al., entitled Systems and Methods for Monitoring Terrestrially Reused Satellite Frequencies to Reduce Potential Interference, and US 2003/0073436 to Karabinis et al., entitled Additional Systems and Methods for Monitoring Terrestrially Reused Satellite Frequencies to Reduce Potential Interference; the disclosures of which are hereby incorporated herein by reference in their entirety as if set forth fully herein. The second (e.g., Inmarsat) satellite 302 and/or other system element(s) associated with the second (e.g., Inmarsat) satellite 302, such as the satellite gateway 333, and/or the interference reducer 337, may be configured to further process the detected and/or estimated measure of aggregate interference reaching the second (e.g., Inmarsat) satellite 302 and relay a measure of the further processed detected and/or estimated measure of aggregate interference reaching the second (e.g., Inmarsat) satellite 302 and/or the detected and/or estimated measure of aggregate interference reaching the second (e.g., Inmarsat) satellite 302 to a system element (such as the controller 327) associated with the first (e.g., MSV) satellite 301 and/or at least one terrestrial infrastructure component, ATC, or ATN associated with the first (e.g., MSV) satellite 301. Responsive to the received measure of the further processed detected and/or estimated measure of aggregate interference reaching the second (e.g., Inmarsat) satellite 302 and/or the detected and/or estimated measure of aggregate interference reaching the second (e.g., Inmarsat) satellite 302 having approached, equaled, or exceeded a predetermined threshold, the at least one terrestrial infrastructure component, ATC, ATN, and/or at least one radioterminal that is substantially within the Geographic Region 312 of Satellite & ATC Coverage (of the first communications system including satellite 301 and ATCs 321a-c) and is associated with the first satellite 301 may be configured to reduce a level of transmitted radiation.

The at least one beam 315 (satellite cell or antenna pattern) that may be formed by the Second Satellite 302 substantially over the Geographic Region 312 of Satellite & ATC Coverage, as illustrated in FIG. 3, may be a receive-only beam. The receive-only beam may provide to the second (e.g., Inmarsat) satellite 302 and/or other system element(s) associated with the second (e.g., Inmarsat) satellite 302, such as a satellite gateway 333, and/or the interference reducer 337, a measure of an aggregate signal power that is reaching the second (e.g., Inmarsat) satellite 302, representative of at least one emission occurring substantially within the Geographic Region 312 of Satellite & ATC Coverage (e.g., MSV System), as illustrated in FIG. 3, over a band of frequencies that is used by at least one radioterminal and/or at least one terrestrial infrastructure component (such as one or more of ATCs 321a-c).

In some embodiments, the second (e.g., Inmarsat) satellite 302, a satellite gateway(s) 333 associate with the second satellite 302, and/or other system component(s) thereof may be equipped with an interference reducer 337 to reduce interference in signals that are intended for the second (e.g., Inmarsat) satellite 302, caused by emissions from the first communications system from one or more of radioterminals 325a-c and/or ATCs 321a-c (occurring from within any geographic region of satellite 301 and/or ATC system coverage of the first communications system associated with the first satellite 301). Interference reducers are known to those of skill in the art and need not be discussed further herein. Embodiments of interference reducers for reducing interference in satellite systems are disclosed for example, in the previously referenced U.S. Pat. No. 6,684,057, to Karabinis, entitled Systems and Methods for Terrestrial Reuse of Cellular Satellite Frequency Spectrum, published Jan. 27, 2004; in Utility patent application Ser. No. 10/890,758, to Karabinis et al., entitled Intra- and/or Inter-System Interference Reducing Systems and Methods for Satellite Communications Systems, filed Jul. 14, 2004; in Provisional Patent Application No. 60/573,991, to Karabinis, entitled Systems and Methods for Monitoring Selected Terrestrially Reused Satellite Frequency Signals to Reduce Potential Interference, filed May 24, 2004; and in Utility patent application Ser. No. 11/133,102 to Karabinis entitled Systems and Methods for Monitoring Selected Terrestrially Reused Satellite Frequency Signals to Reduce Potential Interference, filed May 19, 2005. The disclosures of all of these patents and patent applications are hereby incorporated herein by reference in their entirety as if set forth fully herein.

It will be understood by those having skill in the art that some modifications may be applied to the interference reducer embodiments that are disclosed in the immediately above referenced Patent, Patent Applications, and Provisional Patent Application when applying an interference reducer embodiment (of the Patent, Patent Applications, and/or Provisional Patent Application) to reducing interference of a signal intended for the second (e.g., Inmarsat) satellite 302. For example, whereas in embodiments disclosed in the above referenced Patent, Patent Applications, and Provisional Patent Application, the interference reducer may be configured to operate on a desired signal that is intended for the first (e.g., MSV) satellite 301 ("Signal of satellite cell S" in FIG. 3 of the above referenced patent application Ser. No. 10/890,758; signal "$f_U$" of the "Satellite Radiotelephone Link" in FIG. 1 of the above referenced U.S. Pat. No. 6,684,057), the interference reducer 337, in accordance with embodiments of the present invention, may be configured to operate on a desired signal that is intended for the second (e.g., Inmarsat) satellite 302. Furthermore, whereas in the embodiments disclosed in the above referenced Patent, Patent Applications, and Provisional Patent Application, the interference reducer may be configured to operate at an MSV system location (such as at an MSV satellite gateway and/or other MSV facility), the interference reducer 337, in accordance with the embodiments of the present invention, may be configured to operate at an Inmarsat system location (such as at an Inmarsat satellite gateway and/or other Inmarsat facility). In addition to the above, at least some of the signals "T, U, V, W, X, Y, A3, A5, A7, B4, B6, B7" that are shown in FIG. 3 of the above referenced patent application Ser. No. 10/890,758 and/or the signal "142" shown in FIG. 1 of the above referenced U.S. Pat. No. 6,684,057, may be transported to an Inmarsat system location to be used as inputs to the interference reducer 337. In some embodiments, the interference signal input(s) "T, U, V, W, X, Y, A3, A5, A7, B4, B6, B7" that are shown in FIG. 3 of the above referenced patent application Ser. No. 10/890,758 and/or the signal "142" shown in FIG. 1 of the above referenced U.S. Pat. No. 6,684,057, and/or a desired signal plus interference (that may be provided to an Inmarsat system location by an Inmarsat satellite) may be delay-equalized to substantially align in time the interfering signal path(s) provided via the first (e.g., MSV) satellite relative to the interference signal path(s) provided via the Inmarsat satellite. In some embodiments, the second (e.g., Inmarsat) satellite 302 may form spot beams (that may be receive-only spot beams) over ATC areas of the first (e.g., MSV) system and may thus provide to the interference reducer 337 measures of the interfering signals. In some embodiments, measures of the interfering signals are provided by the first (e.g., MSV) satellite 301 and the second (e.g., Inmarsat) satellite 302. In other embodiments, a desired signal plus interference that may be provided to a system facility of the second (e.g., Inmarsat) system (such as satellite gateway 333), by the second (e.g., Inmarsat) satellite 302, may be transported to a system facility of the first (e.g., MSV) system (such as satellite gateway 323) and the interference reducer 337 may be configured to be functionally operative at the MSV system facility to reduce interference of a signal that is intended for the second (e.g., Inmarsat) satellite 302.

In addition, or in alternatives, monitoring and control of down-link interference may be provided according to embodiments of the present invention. In accordance with system embodiments addressed earlier, utilizing L-band spectrum, portions of the down-link band frequencies of an L-band (for example, from 1525 MHz to 1559 MHz) may be used by a first communications system and a satellite (for example, satellite 301) thereof that may be operated by a first satellite operator (e.g., Mobile satellite Ventures, LP "MSV") to transmit information to at least one satellite radioterminal (such as radioterminals 325a-c). The portions of the down-link band frequencies of the L-band (or a subset thereof) may also be used by at least one terrestrial infrastructure component (e.g., ATCs 321a-c) that may be operated by and/or associated with the first communications (e.g., MSV) system and the satellite 301 thereof, to transmit information to at least one of the radioterminals 325a-c. A radioterminal of a second communications system (such as satellite radioterminal 335a of the second communications system including satellite 302, such as an Inmarsat system) may be operative while proximate to a terrestrial infrastructure component (such as ATC 321c) of the first communications system that is radiating at least some frequencies of the portions of the down-link band frequencies of the L-band (or a subset thereof) to communicate with at least one radioterminal (such as radioterminal 325c). As such, the radioterminal 335a of the second communications system may experience interference, such as overload interference and/or inter-modulation interference.

In some embodiments, the radioterminal 335a of the second communications system may be operatively configured with signaling capability, such as, for example, in-band signaling capability, to inform a system component, such as the satellite 302, satellite gateway 333, and/or another component of the communications system, of a Bit Error Rate (BER) measure at the radioterminal 335a. In response to the BER measure received by the second communications system, the second communications system (e.g., the satellite 302 and/or the satellite gateway 333) may provide a different amount of power for transmissions to the radioterminal 335a (such as more power for transmission to the radioterminal 335a if the BER measure is, for example, greater than a first predetermined threshold, or less power to the radioterminal 335a if the BER measure is, for example, smaller than a second predetermined threshold; where the first and second predetermined thresholds may be the same or different) relative to the power delivered for transmission to the radioterminal 335a by the second communications system prior to the reception by the second communications system of the BER measure transmitted by the radioterminal 335a via a signaling channel.

In other embodiments, in response to the BER measure received by the second communications system from the radioterminal 335a, and following a predetermined increase in power level for transmission to the radioterminal 335a for the purpose of establishing a BER measure that may be within an acceptable range, the second communications system may command the radioterminal 335a to utilize a different down-link (forward-link) carrier and/or channel, if the radioterminal 335a continues to report to the system a BER measure that is not within the predetermined range and is inferior to the system's Quality of Service (QoS) standard for the service being provided by the radioterminal 335a. The different down-link (forward-link) carrier and/or channel may be chosen from an available pool of carriers and/or channels, and/or the different down-link (forward-link) carrier and/or channel may be chosen at a maximum or near maximum frequency distance relative to a frequency or frequencies used by at least one terrestrial infrastructure component and/or radioterminal such as ATCs 321a-c and/or radioterminals 325a-c.

In yet other embodiments, in response to a BER measure received by the satellite 302 from the radioterminal 335a, the system may command the radioterminal 335a to utilize a different down-link (forward-link) carrier and/or channel without first attempting to provide more power for transmission to the radioterminal 335a. In some embodiments, the second communications system may process at least two BER measures (i.e., a sequence of BER measures) before sending more power for transmissions to the radioterminal 335a and/or commanding the radioterminal 335a to utilize a different down-link (forward-link) carrier and/or channel. In some embodiments, one or more down-link (forward-link) signaling carriers/channels may be provided by the second (e.g., Inmarsat) satellite 302 at a frequency separation that is maximally-distant, or near maximally-distant, from a down-link (forward-link) band of frequencies used by the ATCs 312a-c of the first communications (e.g., MSV) system.

In additional embodiments of the present invention, to further reduce the potential of down-link interference, two systems (for example, a first communications system including satellite 301 and a second communications system including satellite 302) that are using a band of frequencies, such as an L-band of frequencies, may partition the band of frequencies into relatively large and contiguous blocks of spectrum, as illustrated above in FIG. 2, and use the blocks of spectrum in accordance with a minimum or substantially minimum interference potential criterion. As illustrated in FIG. 2, a first relatively large contiguous block of down-link frequencies 201 (labeled "MSV ATC and/or Satellite Operations," which may be, for example, approximately 10 MHz in bandwidth) may be used by MSV to offer satellite and ATC service(s) using satellite 301 and/or ATCs 321a-c. Still referring to FIG. 2, a second block of frequencies 203 (labeled "INMARSAT Operations") may be, for example, approximately 17 MHz in bandwidth. The second block of frequencies 203 labeled "INMARSAT Operations" may be used by Inmarsat to offer satellite services with, for example, a first sub-block of frequencies 203a (that may be closest in frequency to the first block of frequencies 201 used by MSV for satellite and/or ATC operations) allocated, for example, by Inmarsat to maritime and/or land-mobile operations using satellite 302; followed by, for example, a second sub-block of frequencies 203b that may be allocated by Inmarsat to aeronautical operations using satellite 302; and followed by, for example, a third sub-block of frequencies 203c that may be allocated by Inmarsat to land-mobile and/or aeronautical operations using satellite 302. Following the INMARSAT Operations block (e.g., the second block of frequencies 203), as illustrated in FIG. 2, a third block of frequencies 205 (labeled "MSV Satellite Operations," which may be, for example, approximately 7 MHz in bandwidth) may be used by MSV for satellite services only using satellite 301. In some embodiments, at least a portion of the third block of frequencies 205 may also be used by MSV for the provision of ATC/ATN communications.

In accordance with the illustrative embodiment relating to L-band spectrum usage by two system operators (as depicted in FIG. 2 and described immediately above), at least some of the land-mobile operations of the second (e.g., Inmarsat) system comprising land-mobile radioterminals (such as radioterminals 335a-c) that may be most susceptible to down-link interference (i.e., overload and/or inter-modulation interference), comprising, for example, a class of radioterminals configured for high-speed data mode(s) (such as Inmarsat radioterminals of type/class GAN, R-BGAN, and/or BGAN), may be allocated down-link carrier frequencies in the third Inmarsat sub-block 203c and/or at a maximum or near maximum frequency distance away from ATC/ATN operations of the first (e.g., MSV) system using ATCs 321a-c. At least some aeronautical operations of the second (e.g., Inmarsat) system may also be conducted over the third Inmarsat sub-block 203c and/or at a maximum, or near maximum, frequency separation from ATC/ATN operations of the first (e.g., MSV) system using ATCs 321a-c. Owing to the mobility aspects of some land-mobile radioterminals (and/or some non-land-mobile radioterminals), at least some of the radioterminals 335a-c communicating with satellite 302 may be operative, from time-to-time, from locations proximate to base station/ATC emissions (such as emissions generated by one or more of ATCs 312a-c) generated by the communications system including satellite 301. The at least some radioterminals that may be operative proximate to such locations may include at least one radioterminal that may be relatively more susceptible to down-link interference than other radioterminals. (A radioterminal providing a high-speed data service, for example, may be more susceptible to down-link interference than a radioterminal providing, for example, a voice service and/or low-speed data service.) The at least one radioterminal that may be relatively more susceptible to down-link interference than the other radioterminals may be allocated a down-link carrier frequency in the third Inmarsat sub-block 203c and/or at a maximum or near maximum frequency distance away from MSV's ATC operations using ATCs 321a-c. This may be accomplished a priori by the system, during a call set-up procedure between the radioterminal (such as one of the radioterminals 335a-c) and the system (including the satellite 302), prior to establishing an initial communications channel, via recognition by the system of a radioterminal profile/identity/service, or it may be accomplished a posteriori, after an initial communications channel has been established and a measure of unacceptable performance has been provided to the system (including the satellite 302) by the radioterminal (such as one of the radioterminals 335a-c), as described earlier.

In further embodiments of the invention, an operator (e.g., Inmarsat) of a system including the satellite 302 may deploy at least one terrestrial infrastructure component, ATC, and/or ATN in parts of, all, or substantially all of the geographic region 312 that an operator (e.g., MSV) of a system including the satellite 301 plans to, and/or has deployed, at least one terrestrial infrastructure component, such as at least one of ATCs 321a-c. Having done so, the second communications system operator (e.g., Inmarsat) may also configure at least some of the radioterminals (such as radioterminals 335a-c) that are capable of communicating with the satellite 302 of the second communications system to also be capable of communicating with the at least one terrestrial infrastructure component, ATC, and/or ATN of the second and/or first communications system, and/or a terrestrial infrastructure of any other system. As such, a radioterminal 335a of the second communications system including satellite 302 (that may be operative proximate to at least one terrestrial infrastructure component such as ATC 321c of the first communications system, and may thus be subjected to down-link interference) may establish a communications link with the at least one terrestrial infrastructure component (such as ATC 321c) of the second and/or first communications system, and/or the terrestrial infrastructure of the any other system (instead of communicating via a satellite) to minimize, or eliminate the potential of down-link and/or up-link interference.

In other embodiments of the invention, in order to further reduce or eliminate the potential of down-link interference, two systems (such as first and second communications systems respectively including the satellites 301 and 302) that may use a band of frequencies (such as an L-band of frequencies) may partition the band of frequencies into relatively large and contiguous blocks of spectrum, as illustrated in FIG. 2. Moreover, at least some radioterminals (such as radioterminals 335a-c of the second communications system) may incorporate filtering (such as band-pass, low-pass, high-pass, notch and/or any other type of filtering) to substantially reduce further and/or eliminate potential interference.

Figure 4:
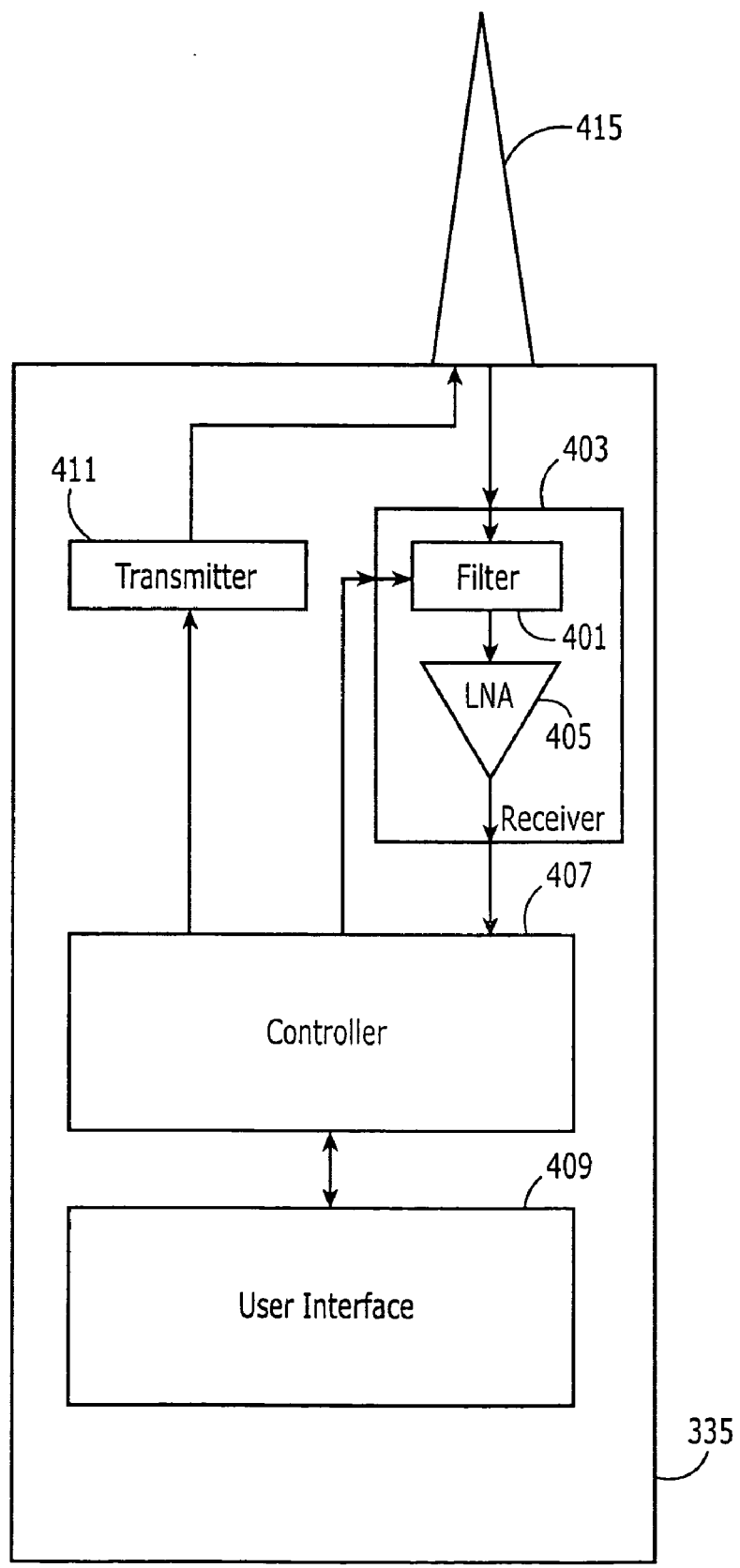
FIG. 4 is a block diagram illustrating radioterminals according to embodiments of the present invention.

As shown in FIG. 4, at least some radioterminals 335 configured to communicate with the satellite 302 of the second communications (e.g., Inmarsat) system may, for example, be configured with a receiver filter 401 that attenuates at least some frequencies of the "MSV ATC and/or Satellite Operations" frequency block 201 and/or at least some frequencies of any other MSV frequency block, more than frequencies of the "INMARSAT Operations" block 203. More particularly, the radioterminal 335 may include a controller 407, a transmitter 411, a receiver 403, an antenna 415, and a user interface 409. In addition, the receiver 403 may include a filter 401 and a Low Noise Amplifier (LNA) 405 with the filter 401 provided, in some embodiments, between the antenna 415 and the LNA 405. In applications requiring only reception, the transmitter 411 may be omitted. In radiotelephone applications, the user interface 409 may include a microphone, a speaker, a display, and a keypad. In applications not providing voice communications, a microphone and/or a speaker may be omitted from the user interface 409.

The filter 401 may be a front-end filter (operatively configured at a Radio Frequency (RF) section of the radioterminal receiver 403; before and/or after the receiver Low Noise Amplifier (LNA) 405), or the filter 401 may be operatively distributed between RF, Intermediate Frequency (IF), and/or base-band sections of the radioterminal 335 receiver 403. A filter characteristic, such as an attenuation response of the filter 401, may be operationally responsive to a geographic location of the radioterminal 335 and/or a level of interference received at the radioterminal 335. For example, if the radioterminal 335 is operative in North America (or proximate to North America) the filter 401 attenuation response may be configured to attenuate at least some of the frequencies occupying the "MSV ATC and/or Satellite Operations" frequency block (e.g., block 201 of FIG. 2) and/or at least some of the frequencies of any other MSV frequency block. If the radioterminal 335 is operative outside North America, the filter 401 may be switched out and/or by-passed, or may be altered in at least one characteristic. The controller 407, for example, may determine a location of the radioterminal 335 responsive to information/signaling received from the satellite 302 and/or responsive to information/signaling received from a Global Positioning Satellite (GPS) system and/or other radio positioning system. In combination with the above or in an alternative, the controller 407 may determine a location of the radioterminal 335 responsive to information provided by a user through the user interface 409. Accordingly, the controller 407 may switch-out and/or by-pass the filter 401 when the radioterminal 335 is in a geographic area of relatively low expected interference so that the filter 401 is not coupled between two or more elements of receiver 403 such as, for example, the antenna 415 and the LNA 405. When the radioterminal 335 is in a geographic area of relatively high expected interference, the controller 407 may switch-in the filter 401 so that the filter 401 is coupled between the antenna 415 and the LNA 405 and/or coupled between two or more elements of the receiver 403 that may or may not include the antenna 415 and/or the LNA 405.

In some embodiments, at power-on of the radioterminal 335 the radioterminal 335 may be configured to function with the filter 401 by-passed (or switched-out), totally or partially. After power-on of the radioterminal 335, the controller 407 may monitor a level of received interference at the radioterminal 335. If the received level of interference at the radioterminal 335 exceeds a predetermined threshold, the controller 407 may switch-in the filter 401 so that the filter is coupled between two or more elements of the receiver 403 such as, for example, between the antenna 415 and the LNA 405, as illustrated in FIG. 4. If the received interference is less than the predetermined threshold, the controller 407 may switch-out and/or by-pass the filter 401 so that the filter 401 is not coupled between any two or more elements of the receiver 403. Monitoring the level of received interference at the radioterminal 335 may comprise detecting and/or estimating (at the radioterminal and/or elsewhere) a power level received at the radioterminal 335 over a frequency interval (sub-band) that is used by MSV to provide ATC/ATN communications.

In other embodiments, radioterminals (such as one or more of radioterminals 325a-c) of the first communications (e.g., MSV) system of FIG. 3 may also be configured with a band-pass, low-pass, high-pass, notch and/or any other type of receiver-chain filter characteristic that attenuates frequencies that lie outside of one or more MSV frequency blocks.

In the drawings and specification, there have been disclosed embodiments of the invention and, although specific terms are employed, they are used in a generic and descriptive sense only and not for purposes of limitation, the scope of the invention being set forth in the following claims.

That which is claimed is:

1. A method of operating first and second satellite radioterminal communications systems including respective first and second satellites providing communications service over a geographic area, the method comprising:

providing communications between a radioterminal and the second satellite of the second satellite radioterminal communications system;

generating a measure of interference from the first satellite radioterminal communications system including the first satellite to the radioterminal, wherein the first satellite radioterminal communications system is a source of the interference to the radioterminal;

transmitting the measure of interference to an element of the second satellite radioterminal communications system via the second satellite; and transmitting the measure of interference from the second satellite radioterminal communications system including the second satellite to the first satellite radioterminal communications system including the first satellite.

2. A method according to claim 1 wherein the measure of interference comprises a bit error rate.

3. A method according to claim 1 further comprising:
increasing a power of transmission from an element of the second satellite radioterminal communications system to the radioterminal when the measure of interference exceeds a threshold.

4. A method according to claim 1 further comprising:
changing a frequency for communications between the radioterminal and an element of the second satellite radioterminal communications system when the measure of interference exceeds a threshold.

5. A method according to claim 1 wherein the first and second satellite radioterminal communications systems are operated by different entities.

6. A method according to claim 1 wherein the first and second satellite radioterminal communications systems are operated by a same entity.

7. A method according to claim 1 wherein the second satellite radioterminal communications system comprises at least one satellite and wherein the radioterminal is configured to communicate with the at least one satellite of the second satellite radioterminal communications system.

8. A method according to claim 1 wherein the first satellite radioterminal communications system comprises at least one satellite and/or at least one terrestrial component, wherein the at least one satellite and/or the at least one terrestrial component of the first satellite radioterminal communications system is/are configured to communicate with at least one radioterminal.

9. A method according to claim 1 wherein the first and second satellite radioterminal communications systems are each configured for communication using L band and/or S band frequencies.

10. A method according to claim 1 wherein transmitting the measure of interference from the second satellite radioterminal communications system including the second satellite to the first satellite radioterminal communications system including the first satellite comprises transmitting the measure of interference via ground based infrastructure.

11. A method of operating first and second satellite radioterminal communications systems including respective first and second satellites providing communications service to a plurality of radioterminals over a geographic area, the method comprising:
providing communications between a radioterminal and the second satellite of the second satellite radioterminal communications system;
generating a measure of interference from the first satellite radioterminal communications system including the first satellite to the radioterminal of the second satellite radioterminal communications system including the second satellite, wherein the first satellite radioterminal communications system is a source of the interference to the radioterminal of the second satellite radioterminal communications system;
transmitting the measure of interference to an element of the second satellite radioterminal communications system via the second satellite; and
transmitting the measure of interference from the second satellite radioterminal communications system including the second satellite to the first satellite radioterminal communications system including the first satellite;
wherein transmitting the measure of interference from the second satellite radioterminal communications system including the second satellite to the first satellite radioterminal communications system including the first satellite comprises transmitting the measure of interference via ground based infrastructure; and
wherein the measure of interference from the first satellite radioterminal communications system to the radioterminal of the second satellite radioterminal communications system comprises a measure of interference from the first satellite of the first satellite radioterminal communications system and/or from a terrestrial infrastructure component of the first satellite radioterminal communications system.

12. A method according to claim 10 wherein transmitting the measure of interference comprises transmitting the measure of interference via a satellite gateway of the second satellite radioterminal communications system, via the ground based infrastructure, and via a satellite gateway of the first satellite radioterminal communications system.

13. A method of operating first and second satellite radioterminal communications systems including respective first and second satellites providing communications service over a geographic area, the method comprising:
providing communications between a radioterminal and the second satellite of the second satellite radioterminal communications system;
generating a measure of interference from the first satellite radioterminal communications system including the first satellite to the radioterminal, wherein the first satellite radioterminal communications system is a source of the interference to the radioterminal;
transmitting the measure of interference to a ground based element of the second satellite radioterminal communciations system via the second satellite; and
transmitting the measure of interference from the second satellite radioterminal communications system including the second satellite to the first satellite radioterminal communications system including the first satellite.

14. A method according to claim 13 wherein the measure of interference comprises a bit error rate.

15. A method according to claim 13 further comprising:
increasing a power of transmission from an element of the second satellite radioterminal communications system to the radioterminal when the measure of interference exceeds a threshold.

16. A method according to claim 13 further comprising:
changing a frequency for communications between the radioterminal and an element of the second satellite radioterminal communications system when the measure of interference exceeds a threshold.

17. A method according to claim 13 wherein the first and second satellite radioterminal communications systems are operated by different entities.

18. A method according to claim 13 wherein the first and second satellite radioterminal communications systems are operated by a same entity.

19. A method according to claim 13 wherein the second satellite radioterminal communications system comprises at least one satellite and wherein the radioterminal of the second satellite radioterminal communications system is configured to communicate with the at least one satellite of the second satellite radioterminal communications system.

20. A method according to claim 13 wherein the first satellite radioterminal communications system comprises at least one satellite and/or at least one terrestrial component, wherein the at least one satellite and/or the at least one terrestrial component of the first satellite radioterminal communications system is/are configured to communicate with at least one radioterminal.

21. A method according to claim 13 wherein the first and second satellite radioterminal communications systems are each configured to provide communications using L band and/or S band frequencies.

22. A method according to claim 13 wherein transmitting the measure of interference from the second satellite radioterminal communications system including the second satellite to the first satellite radioterminal communications system including the first satellite comprises transmitting the measure of interference via ground based infrastructure.

23. A method of operating first and second satellite radioterminal communications systems including respective first and second satellites providing communications service to a plurality of radioterminals over a geographic area, the method comprising:
   providing communications between a radioterminal and the second satellite of the second satellite radioterminal communications system;
   generating a measure of interference from the first satellite radioterminal communications system including the first satellite to the radioterminal of the second satellite radioterminal communications system including the second satellite, wherein the first satellite radioterminal communications system is a source of the interference to the radioterminal of the second satellite radioterminal communications system;
   transmitting the measure of interference to a ground based element of the second satellite radioterminal communications system via the second satellite; and
   transmitting the measure of interference from the second satellite radioterminal communications system including the second satellite to the first satellite radioterminal communications system including the first satellite;
   wherein transmitting the measure of interference from the second satellite radioterminal communications system including the second satellite to the first satellite radioterminal communications system including the first satellite comprises transmitting the measure of interference via ground based infrastructure; and
   wherein the measure of interference from the first satellite radioterminal communications system to the radioterminal of the second satellite radioterminal communications system comprises a measure of interference from the first satellite of the first satellite radioterminal communications system and/or from a terrestrial infrastructure component of the first satellite radioterminal communications system.

24. A method according to claim 22 wherein transmitting the measure of interference comprises transmitting the measure of interference via a satellite gateway of the second satellite radioterminal communications system, via the ground based infrastructure, and via a satellite gateway of the first satellite radioterminal communications system.

25. A method according to claim 1 wherein
   transmitting the measure of interference to an element of the second satellite radioterminal communications system via the second satellite comprises transmitting the measure of interference to a ground based element of the second satellite radioterminal communications system.

26. A method according to claim 10 wherein the measure of interference from the first satellite radioterminal communications system to the radioterminal comprises a measure of interference from the first satellite of the first satellite radioterminal communications system and/or from a terrestrial infrastructure component of the first satellite radioterminal communications system.

27. A method according to claim 13 wherein the second satellite radioterminal communications system comprises at least one satellite and wherein the radioterminal is configured to communicate with the at least one satellite of the second satellite radioterminal communications system.

28. A method according to claim 22 wherein the measure of interference from the first satellite radioterminal communications system to the radioterminal comprises a measure of interference from the first satellite of the first satellite radioterminal communications system and/or from a terrestrial infrastructure component of the first satellite radioterminal communications system.

* * * * *